Dec. 6, 1960  W. C. MULLER ET AL  2,963,362
PROCESS FOR REDUCING HIGHER HALIDES
Filed Feb. 27, 1956
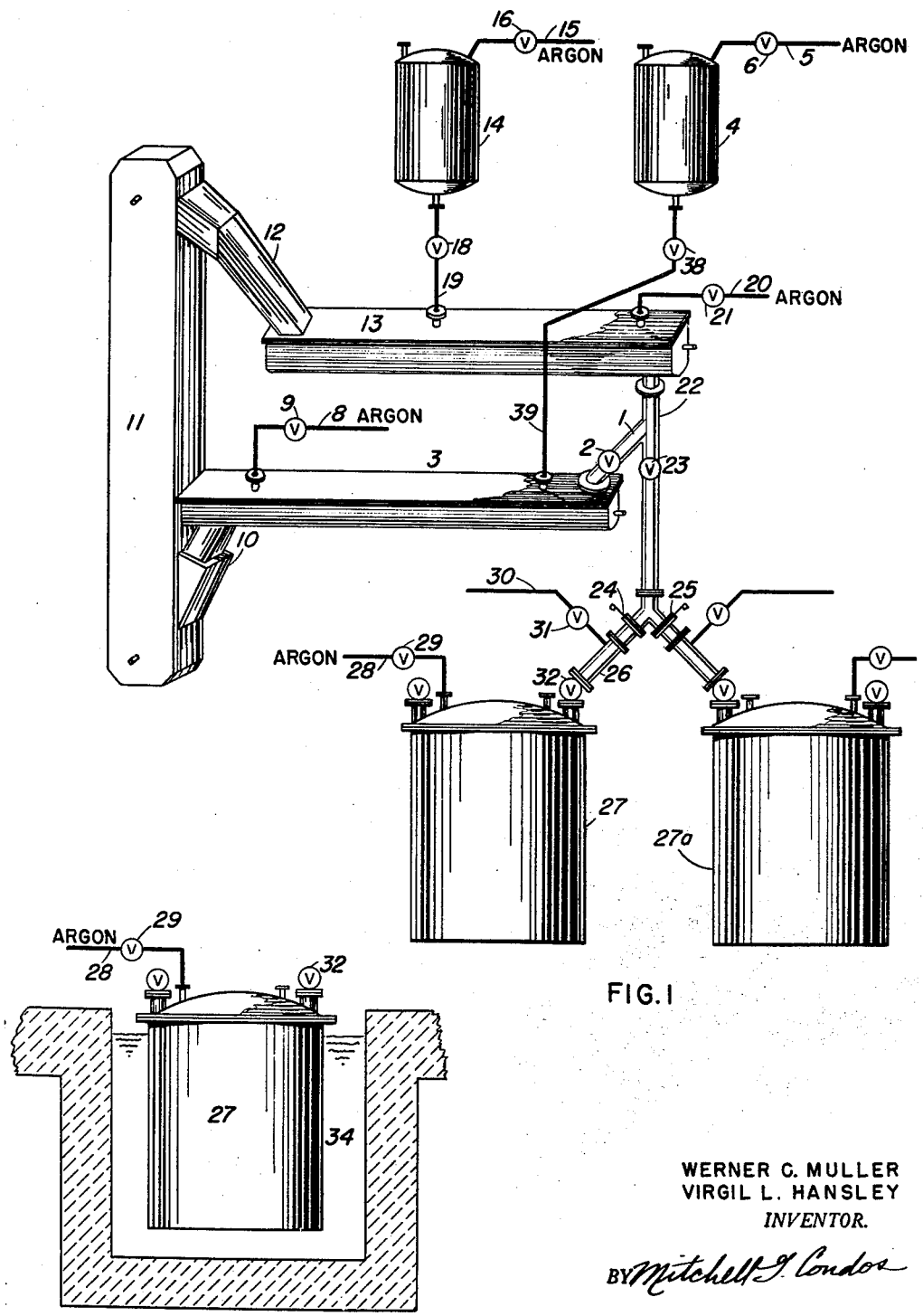
WERNER C. MULLER
VIRGIL L. HANSLEY
INVENTOR.
BY Mitchell & Condor

United States Patent Office 2,963,362
Patented Dec. 6, 1960

2,963,362
PROCESS FOR REDUCING HIGHER HALIDES

Werner C. Muller, Roslyn, N.Y., and Virgil L. Hansley, Cincinnati, Ohio, assignors to National Distillers and Chemical Corporation, New York, N.Y., a corporation of Virginia Filed Feb. 27, 1956, Ser. No. 567,894

12 Claims. (Cl. 75—84.5)

The present invention relates to an improved process for controlled reduction of halides of certain multi-valent metals and non-metals. More specifically, the invention relates to a novel and improved process for controlled reduction of chlorides of suitable multi-valent metals and non-metals for production of such metals and non-metals and, more particularly, to their production in massive form.

In certain processes for production of metals by reduction of salts thereof, and which may be illustrated by reduction of titanium tetrachloride for production of titanium sponge, the process is carried out in batch-wise operation with use of a metal such as magnesium as the reducing agent. In such a process, the reduction step and the sponge growth step are carried out simultaneously in the same vessel and at relatively high temperatures, e.g., above 600° C. up to and including the fusion temperature of sodium chloride. Such a method of operation generally results in formation of hot spots in the reaction mixture as localized temperatures are obtained which are higher than the average temperature (e.g., 700–800° C.) of the reaction mixture. In large scale operations, it is not unusual for localized temperatures to occur that are as high as the melting point of titanium metal itself as fused particles of titanium sponge are commonly found in the final product. Under such severe operating conditions, by-product salts and even incompletely reduced sub-chlorides of titanium become so completely surrounded or encased in dense and massive titanium sponge that aqueous leaching operations are difficult or impractical whereby volatilization of the residual by-product salt from the titanium sponge is oftentimes resorted to. Although drainage operations may be used to remove the bulk of the salt by-product while it is still molten, the drained sponge still contains substantial portions of residual salts which must be leached out or removed by suitable means such as distillation. Besides yielding a titanium sponge product which is difficult to purify, the simultaneous operation of the reduction and sponge growth phase of the described process results in formation of a type of sponge that adheres to the sides and bottoms of the reaction vessel employed. Such an adherent sponge is difficult to remove whereby resort is often made to machining operations, such as by means of a lathe, to remove the adherent sponge.

Objectionable features of a process as aforedescribed are obviated or substantially obviated by recently developed and improved sodium reduction processes wherein the two steps of reduction and sponge growth are separated, thereby permitting each step to be carried out in a more efficient manner and under more controlled conditions. In such improved processes, the first or chemical reduction reaction step is carried out, preferably in continuous manner, at a relatively low temperature such as from about 150 to about 600° C. The reduction step may be carried out in any of several ways and, in one method, sodium and the halide of a multi-valent component to be reduced are introduced simultaneously into a stirred reactor, preferably containing a mass of a pre-formed mixture of finely divided solid product of the reaction, in substantially stoichiometric amounts for the complete sodium reduction of the halides of the multi-valent component. As illustrated by the reduction of titanium tetrachloride, as the product of reaction forms from such a stoichiometric reaction, it may be continuously or semi-continuously withdrawn from the reduction vessel as a reduction step product consisting of a finely divided solid substantially containing the theoretical percentage of titanium metal mixed with salt, i.e., titanium:sodium chloride (17 weight percent titanium). Such a reduction step can be carried out at a temperature of from about 150 to about 600° C. or higher as long as a finely divided reaction mixture is produced that can be handled easily by mechanical means and agitated with conventional mixing apparatus. The finely divided solid mixture thus obtained may be cooled or stored or it may immediately be transported by suitable means such as a screw conveyor to a sintering or heat treating vessel wherein the sponge growth phase is carried out. The sponge growth phase commences almost immediately upon substantial melting of the by-product sodium halide and proceeds as long as the mass remains molten. In the sintering operation, the titanium-salt mixture agglomerates in the form of fine particles which become matted together as a sponge, the filaments of which are generally round in cross section, of relatively smooth surfaces and having the appearance of titanium which has been melted and solidified even though the sponge formation occurs at a temperature of 800–1150° C., i.e., almost 1000° below the melting point of titanium.

As illustrated by the reaction that occurs between sodium and titanium tetrachloride for its complete reduction to titanium metal, the reaction is violent and highly exothermic with a heat release of about 7500 B.t.u. per pound of titanium formed and, for each step of such a reduction, the heat evolved is as follows:

|  | B.t.u. |
|---|---|
| First Cl removed from $TiCl_4$ | 2960 |
| Second Cl removed from $TiCl_4$ | 1875 |
| Third and fourth Cl (average) | 1380 |

When the described stoichiometric sodium reduction process is carried out on a small scale with simultaneous addition of the reactants (e.g., sodium and titanium tetrachloride) to a pre-formed mixture of a finely divided solid product of the reduction reaction, the radiation area available in conventional types of stirred reactors is normally adequate to dissipate the heat of reaction even though it is a highly exothermic reaction. However, when such a process is carried out on a large scale, the radiation areas of reactors that are normally required are generally inadequate whereby localized temperatures oftentimes occur that make it difficult to exercise adequate temperature control in the reduction operation and objectionable fusion of particles tends to occur in the reduction reaction mixture. Occurrence of such fusion is objectionable in that it increases power requirements for agitation of the reaction mixture and deleteriously affects the sintering operation by formation of granular particles.

It is the primary purpose of this invention to provide a method for controlled reduction of halides of certain multi-valent metals and non-metals in a manner, preferably continuous, whereby the reduction reaction is carried out with improved control of temperature thereby minimizing or obviating occurrences of objectionable fusion of particles in the reduction reaction mixture and processing difficulties resulting therefrom. It is another object of the invention to provide a process for reduction of certain halides of multi-valent metals and non-metals whereby highly exothermic reduction reactions are carried out with improved control of heat release from the reaction. Still another object is the ultimate production of a suitable multi-valent metal or non-metal in improved sponge form by a process wherein a chloride of a suitable multi-valent metal or non-metal is subjected to an improved reduction and sintering treatment. Still other objects and advantages that result from the present invention will be apparent from the more detailed description thereof set forth hereinafter.

The process embodied herein is applicable to treatment of halides of multi-valent metals and multi-valent non-metals of higher valency and reducible to at least one halide of said metals and non-metals of lower valency state, said halides of multi-valent metals and non-metals of higher valency state being characterized by being reducible to an intermediate state of reduction by the corresponding metal or non-metals, and the resulting halides of the multi-valent component of intermediate state of reduction being further reducible by sodium. More particularly, the process embodies treatment of chlorides of such multi-valent metals and non-metals for production of a reduction product that is capable of being converted to a massive form of the metal or non-metal component of the chloride subjected to the reduction operation. Thus, embodied for treatment herein are suitable halides of materials such as titanium, zirconium, molybdenum, iron, germanium, silicon, antimony, and, more particularly, such multi-valent materials in the form of suitable chlorides, iodides, fluorides, etc. Although it is not intended that the invention be limited thereto, particularly embodied for use herein are materials such as titanium tetrachloride, zirconium tetrachloride, chromium trichloride, germanium tetrachloride, silicon tetrachloride, molybdenum pentachloride, cupric chloride, hafnium tetrachloride, uranium pentachloride, and the like. Of such materials, halides of metals such as titanium and zirconium are particularly adapted for practice of this invention, and, hence, for purposes of illustration and not limitation, the invention is described with emphasis on the treatment of titanium tetrachloride for production therefrom of titanium sponge.

As embodied herein, the process comprises maintaining, under conditions of effective mixing, a finely divided solid mass comprising a mixture of (1) a sodium halide and (2) a multi-valent material as aforedescribed, or a corresponding sub-halide of said material, or mixtures thereof, and, depending on the composition of said mass, adding in alternate manner to the mass under agitation, a halide of said multi-valent material of higher valency and sodium, the order of addition of said latter halide and sodium being dependent on the composition of said mass such that the halide of the multi-valent component is reduced to an intermediate state of reduction by particles of the multi-valent material in said mass, and the resulting material of intermediate state of reduction is further reduced with sodium. In carrying out such a process, each of the reactants (i.e., sodium or the halide of the multi-valent component of higher valency state) is added to the mass, and preferably to a relatively larger volume of said mass, in a manner whereby one reactant is thoroughly dispersed throughout the finely divided mass before the mass is contacted with the other reactant, whereby the reactions that occur in the reduction operation are between reactants thoroughly dispersed in the mass and heat released from the reduction reactions is distributed throughout and absorbed by the mass thereby avoiding development of objectionable localized hot spots and temperatures sufficiently high as to induce fusion of particles in the reduction reaction mixture. In each step of the process embodied herein, i.e., in the reduction reaction between the multi-valent component of higher valency state by the multi-valent component per se and in the sodium reduction step, each step is carried out at a temperature below the melting point of the reaction product of each step so as to provide a substantially free-flowing finely divided solid reaction product from each step. Moreover, and as is described more fully hereinafter, the process embodied herein may be carried out in a manner whereby the reduction step is carried out under conditions that provide such improvements while providing, for certain multi-valent components, a reduction product that can be subjected to a combined reduction-sintering treatment for production of a product of improved characteristics.

Although the process embodied herein may be carried out in batch-wise manner, it is particularly applicable to continuous operation and, accordingly, reference is made to the accompanying drawings illustrating an apparatus assemblage suitable for such continuous operation of specific embodiments of the process embodied herein.

In Figure I of the drawings, there is shown a withdrawal line 22 for removal from conveyor-mixer 13 of a mass of finely divided solid particles as the product of the reduction process, line 23 for passage of a portion of said mass to a sintering operation, and line 1 controlled by valve 2 for recycle of the remainder of the mass from line 22 into conveyor-mixer 3. In passing through conveyor-mixer 3, the finely divided mass introduced via line 1 is subjected to effective mixing and is contacted with either liquid sodium or the halide of the multi-valent metal or non-metal, as the case may be depending on the composition of the recycled mass, introduced via line 39 from supply tank 4, the flow through line 39 being controlled by valve 38. The finely divided mass that is conveyed with effective mixing through reactor-mixer 3 falls through chute 10 into elevating device 11 whereby it is elevated to and dropped into chute 12 and thence passed into conveyor-mixer 13. While being conveyed and mixed in conveyor-mixer 13, the finely divided mass is then contacted by the other reactant (i.e., liquid sodium or the halide of the multi-valent component) introduced via line 19 from supply tank 14, the flow through line 19 being controlled by valve 18. The thus contacted mass is then conveyed with effective mixture through conveyor-mixer 13 and is withdrawn via line 22 for handling as aforediscussed by recycling a portion of the finely divided mass and passing the remainder through line 23 to a sintering operation. As shown in Figure I, an inert gas, such as argon, is introduced via line 15 and valve 16 to supply tank 14, via line 5 and valve 6 to supply tank 4; via line 20 and valve 21 into conveyor-reactor 13, and via line 8 and valve 9 into conveyor-reactor 3 whereby the entire system is maintained under an inert atmosphere. In such a system for carrying out the process embodied herein in continuous manner, the circulation system, including conveyor-mixers 3 and 13 and the elevating device 11, should be so designed as to provide, for a particular application, sufficient radiation surface to provide for desired dissipation of heat. Thus, for an apparatus assemblage as aforedescribed, the conveyor-mixers, elevating device, etc. may be extended in size as required to provide added radiation surfaces for dissipation of reaction heat.

The portion of the reduction reaction mixture passed through line 23 flows (when valve 25 is closed) through valve 24 and line 26 to sintering vessel 27 into which an inert gas (e.g., argon) is introduced via line 28 and valve 29 to maintain an inert atmosphere in vessel 27. Evacuation line 30, controlled by valve 31, is provided to remove reactive gases from line 26 when sintering vessel 27 is connected; that is, when vessel 27 is to receive the reduction reaction mixture from line 23, valve 24 is open and valve 25 is closed. When sintering vessel 27 is filled with reaction product valve 25 is opened, valve 24 is closed and valve 32 is closed to permit the removal of sintering vessel 27 from the system without contamination with reactive gases and to provide for flow of reduction reaction mixture into sintering vessel 27a. The sintering vessel that has been filled with the reduction reaction mixture and disconnected from the system is then immersed, as shown in Figure 2, in a suitable heating medium 34 and heated (in instances wherein extraneous heat may be required) to a desired temperature. For applications wherein the multi-valent component per se is higher melting than the sodium halide in the reduction process mixture, the contents of the sintering vessel are maintained above the melting point of the sodium halide present in the reduction product to assist in production of said multi-valent component in massive form and, in the case of a metal such as titanium, to assist in the growth of the finely divided metal particles to a titanium sponge. In instances wherein the multi-valent component per se is lower melting than the sodium halide in the product of the reduction process, the contents of the sintering vessel may be heated to a temperature above the melting point of said component but below the melting point of the sodium halide and the multi-valent component recovered by suitable means. An inert gas, such as argon, is introduced into vessel 27 through line 28 to provide an inert atmosphere in vessel 27 during the sintering operation. When the reduction operation is carried out such that the mixture passed through line 23 contains sub-halides of the multi-valent component, the sintering is carried out in the presence of an amount of sodium at least sufficient to complete the reduction of the sub-halides in the sintering vessel, and, in such a case, the sodium may be provided by having the appropriate amount of sodium present in the bottom portion of the sintering vessel.

With use of an apparatus assemblage as set forth in the drawings, the process embodied herein may be carried out in several ways, depending particularly on the composition of the finely divided mass recycled through line 1. For example, in its use for reduction of titanium tetrachloride under conditions to provide, for withdrawal via line 22, of a finely divided mass of sodium chloride and titanium sub-halides (e.g., titanium dichloride), the mass passed via line 1 into reactor-mixer 3 is first contacted with liquid sodium introduced via line 39, the amount of sodium used being such that it will reduce the sub-halides to titanium, thereby providing for passage into conveyor-reactor 13 a mass of finely divided particles of titanium and sodium chloride. The latter mass is then contacted by titanium tetrachloride introduced (e.g., as a liquid or vapor) via line 19 in an amount sufficient, based on the titanium content of the mass, to be reduced by the titanium to titanium sub-chlorides (e.g., $TiCl_2$, $TiCl_3$), whereby there is obtained via line 22 a finely divided mass of sodium chloride and titanium sub-chlorides, a part of which is recycled via line 1 in the continuous process and the remainder passed via line 23 to the sintering operation.

When the process is operated to produce, for withdrawal via line 22, a finely divided mixture of sodium chloride and titanium, the mass introduced via line 1 into conveyor-reactor 3 is first contacted with titanium tetrachloride introduced via line 39. In this embodiment the amount of titanium tetrachloride added is controlled, relative to the amount of titanium in the finely divided mass, such that the titanium will reduce the titanium tetrachloride to sub-chlorides (e.g., mainly $TiCl_2$) whereby there is passed into conveyor-reactor 13, a finely divided mass of sodium chloride and titanium sub-chlorides. Such a mass is then contacted in conveyor-mixer 13, with liquid sodium introduced via line 19 in an amount stoichiometrically sufficient to reduce the sub-chlorides to titanium to provide, for withdrawal via line 22, of a finely divided mixture of sodium chloride and titanium. A part of the mixture in line 22 is recycled to the process via line 1 and the remainder is passed via line 23 to a sintering operation.

In still other embodiments, the process may be carried out in a manner to produce, for withdrawal via line 22, a finely divided mass of solid particles of sodium chloride, titanium and titanium sub-halides (e.g., titanium dichloride). In such an embodiment, the mass recycled via line 1 into conveyor-mixer 3, may first be contacted with either sodium or titanium tetrachloride. If the mass is first contacted with sodium, the amount of sodium introduced via line 39 is controlled such that the sub-chlorides in the mass are reduced to titanium, thereby providing for passage into conveyor-reactor 13 a finely divided mass of sodium chloride and titanium. Such a mass is then contacted in conveyor-reactor 13 with titanium tetrachloride introduced via line 19 in an amount such that, based on the titanium present in the mass added to conveyor-reactor 13, the titanium reduces the added titanium tetrachloride to sub-halides and provides as a product, for withdrawal via line 22, a finely divided mass of sodium chloride, titanium and titanium sub-halides, a portion of which is recycled via line 1 as aforedescribed and the remainder passed through line 23.

The embodiment wherein the product withdrawn via line 22 is a finely divided mixture of sodium chloride, titanium, and titanium sub-chlorides may also be carried out in the following manner. The recycled mass passed into conveyor-mixer 3 is first contacted with titanium tetrachloride introduced via line 39 in an amount such that it is reduced to titanium sub-chlorides by the titanium present in the recycled mass, thereby providing for passage to conveyor-reactor 13 a finely divided mass of sodium chloride and titanium sub-chlorides (and which may also contain particles of titanium metal). The mass in conveyor-reactor 13 is then contacted with sodium (via line 19) in an amount less than is required to reduce all of the sub-chlorides in the mass to titanium, whereby there is provided for withdrawal via line 22, a finely divided mixture of sodium chloride, titanium, and titanium sub-chlorides.

In the aforesaid description of the invention with emphasis on continuous operation, the embodiments have been described for illustration purposes for production of a finely divided mass to be recycled to the process. As will be apparent to those skilled in the art, however, the process embodied herein may be carried out, such as in batch-wise operation, with use of a starting mass of finely divided sodium chloride and a reduced form of titanium tetrachloride, i.e., titanium or titanium sub-chlorides, or mixtures thereof, with production of a reduction product either similar to or dissimilar to the starting mass. In illustration, the process may be carried out by employing a mass of finely divided solid particles of sodium chloride and titanium maintained under effective agitation, addition thereto of titanium tetrachloride in a controlled amount, correlated with the amount of titanium metal present in the mass to reduce the tetrachloride to sub-chlorides, and then contacting the resulting mixture of sodium chloride and titanium sub-chlorides with sodium in an amount sufficient to reduce the sub-chlorides to titanium. If desired, however, the process can be carried out by employing a finely divided solid mass of sodium chloride and titanium, maintaining said mass under under effective agitation, adding titanium tetrachloride to said mass in an amount, correlated with the amount of titanium present in the mass, to reduce the titanium tetrachloride to sub-chlorides and provide a reduction reaction product of sodium and titanium sub-chlorides or, if desired, adding titanium tetrachloride in an amount, correlated with the amount of titanium present, such that the reduction step product also contains titanium metal along with titanium sub-chlorides and sodium chloride.

In illustration of such embodiments, the following examples are set forth in which the reactions were carried out in a steel vessel, 12" high and 12" in diameter with ⅛" wall thickness, equipped wtih an agitator for maintaining the vessel contents under effective agitation.

Example 1

10.4 lbs. of a finely divided mixture consisting of (1) 0.25 part of $TiCl_2$ and (2) 0.75 part of titanium-sodium chloride (17% titanium) mixture were placed in the vessel and effectively mixed by operation of the agitator. While agitation was maintained, the vessel contents (at 147° C.) were contacted with 0.92 lb. of liquid sodium (the amount stoichiometrically required to reduce the titanium dichloride to titanium) whereby the vessel contents were converted to a mixture of titanium and sodium chloride by sodium reduction of the $TiCl_2$ to titanium.

To the vessel contents, titanium tetrachloride was added in an amount, based on the amount of titanium in the vessel contents for the titanium to reduce the tetrachloride to titanium chloride, whereby there was produced a reaction mixture of 0.25 part of titanium dichloride and 0.75 part of a titanium-sodium chloride mixture, i.e., a mixture such as the starting material used in this example. During the addition of the tetrachloride and its reaction with the titanium particles, the temperature of the vessel contents did not exceed 204° C., and the reduction reaction mixture showed no evidence of particle fusion.

Example 2

13.7 lbs. of a finely divided mixture of titanium and sodium chloride were placed in the reactor and the vessel contents (145° C.) were maintained under agitation. To the vessel contents, 1.8 lbs. of $TiCl_4$ were added, thereby providing a reduction reaction mixture of 0.25 part of $TiCl_3$ and 0.75 part of a titanium-sodium chloride mixture. The temperature of the vessel contents during addition of the tetrachloride, and its reduction to $TiCl_3$ by the titanium particles in the finely divided mixture did not exceed 230° C. To 15.4 lbs of the reduction reaction mixture (at 150° C.) in the vessel, 0.8 lb. of sodium were added, thereby providing a reduction reaction mixture of titanium and sodium chloride by the sodium reduction of the titanium trichloride to titanium. During addition of the sodium and its reaction, the temperature of the vessel contents did not rise above 150° C.

As is apparent from the foregoing description of specific embodiments of the invention utilizing titanium tetrachloride for illustration as to the halide of a multivalent metal of high valency state, the reduction of the titanium tetrachloride is effected by means of titanium metal in finely divided form in the mass subjected to effective mixing whereby the reduction is effected with the reactants highly dispersed in the mass thus providing for effective distribution throughout the mass of the heat released by the reaction. Similarly, and by the described controlled alternate manner of reactant addition, reduction reactions that occur between sodium and the titanium sub-chlorides also are effected with the reactants highly dispersed throughout the mass whereby, in addition to effective distribution of the heat released by the reaction, the mass serves to absorb such heat thereby minimizing or obviating occurrences of temperature sufficiently high as to induce fusion. Still another advantage that results from practice of the invention is that, whereas the complete reduction of titanium tetrachloride to titanium in the stoichiometric method utilizing simultaneous addition of reactants results in a heat release of about 7500 b.t.u. per pound of titanium formed in a localized portion of the reaction mixture, practice of this invention apportions the total amount of heat released in a plurailty of zones and, moreover, in a manner whereby the heat released in each zone is effectively distributed throughout a substantial mass of finely divided particles and the heat release from one stage of the reduction reaction is allowed to wholly or substantially dissipate before the following stage of the reduction process. Thus, in a particular preferred aspect of the invention whereby effective distribution of the heat released is obtained, the respective reactants are added to a relatively large mass of the finely divided reaction product as, for example, by addition of the reactants to form about 2 to about 40 times their weight of reaction product.

In order to illustrate a specific embodiment of the invention and utilizing an apparatus as illustrated in the drawings for continuous operation, the process is carried out for production, as the reduction step product, of a substantially free-flowing finely divided mixture consisting substantially of titanium dichloride and sodium chloride in the ratio of one pound mol of titanium dichloride to two pound mols of sodium chloride per hour. One part per 21 parts of the mixture is passed through line 23 for sintering as described hereinafter and the remainder is recycled via line 1 to conveyor-mixer 3. In conveyor-mixer 3, the finely divided mass is effectively mixed and contacted with liquid sodium (150° C.) introduced via line 39 in an amount sufficient to reduce the titanium dichloride in the recycled mass to titanium metal whereby there passes into conveyor-reactor 13, via chute 10, elevating device 11 and chute 12, a finely divided mass of titanium and sodium chloride (Ti+4NaCl) for introduction into conveyor-mixer 13, the heat of reaction between the sodium and sub-chlorides amounting to about 132,500 B.t.u. per hour. The finely divided mass that passes into conveyor-mixer 13 is then contacted with titanium tetrachloride, introduced via line 19, in an amount correlated with the amount of titanium in the mass introduced to conveyor-mixer 13, such that the titanium metal in the mass reduces the titanium tetrachloride to titanium dichloride, the heat of reaction between the titanium and titanium tetrachloride amounting to about 95,000 B.t.u. per hour. Thus, there is withdrawn via line 22, a finely divided mixture of titanium dichloride and sodium chloride ($TiCl_2$+2NaCl) for handling as aforedescribed, such a reduction reaction mixture being substantially devoid of fused particles as a result of the apportionment of heat released by the reaction and the adequate dissipation of such released heat in the equipment employed.

The portion of the finely divided solid mixture ($TiCl_2$+2NaCl) passed through line 23 is then subjected to contact, in sintering vessel 27, with an amount (2Na per $TiCl_2$) of sodium to reduce the sub-chlorides in the solid mixture to titanium. For this embodiment, the mixture subjected to sintering is introduced to the sintering vessel at a relatively low temperature (e.g., 25° C.) and is contacted therein with solid sodium present in the bottom of the vessel, and the vessel contents heated to 200° C. to initiate reaction wherein the heat of reaction liberated by reduction of the sub-chlorides amounts to about 3080 B.t.u. per pound of titanium produced which is sufficient to raise the temperature of the sintering vessel 27 and its contents to about 900° C. which is effective for titanium sponge formation. Sufficient time is allowed in the sintering operation to permit the complete reduction of traces of titanium sub-halides and, generally, the operation is carried out over a period of from about four to about fourteen hours.

It can be seen from the foregoing embodiment that the process, illustrated by treatment of titanium tetrachloride through the sponge formation stage, is carried out in a manner wherein the total heat of the reduction reactions that occur is divided into three substantial portions, i.e., in the initial reaction between sodium and sub-chlorides in conveyor-mixer 3, the subsequent reaction between titanium and titanium tetrachloride in conveyor-mixer 13, and the reduction of the sub-chlorides with sodium in the sintering vessel. Thus, as a result of having all of the reactions occur with the reactants highly dispersed in the mass of finely divided solids, and the aforestated apportioning of the total heat released from the reduction reactions, at no stage in the process does the heat release reach a level sufficiently high as to induce fusion of particles in the reduction reaction mixture.

In preferred embodiment, the invention is practiced in a manner whereby the product of the reduction operation comprises, in addition to the by-product sodium salt, a sub-halide of the multi-valent component. Thus, and illustrated by use of the process embodied herein for reduction of titanium tetrachloride, the process is preferably carried out in a manner to produce a reduction product that, in addition to NaCl, contains sub-chlorides of titanium. As compared to processes for stoichiometric reaction between titanium tetrachloride and sodium by simultaneous addition of titanium tetrachloride and sodium to a finely divided mass of the product of the reaction, the following advantages are obtainable when the reduction product contains the sub-chlorides whereby the reduction is completed with sodium in the sintering vessel. Such advantages include: (1) the sponge-growth phase is effected in less time and, (2) of considerable importance in the case of titanium, a markedly higher amount of titanium in the sponge is present in the form of relatively large crystals and crystalline structures that possess improved ductility characteristics.

With reference to the alternate manner of addition of the reactants as aforediscussed, such addition may be made in several ways. For example, the total amount of one of the reactants may be added in a single or plurality of increments to the final divided solid mass with a subsequent single or plurality of additions of the other reactant.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for reducing a higher halide of an element that can form more than one halide with a halogen, said higher halide being reducible to a lower halide of said element by reduction reaction with said element per se and said lower halide being further reducible by reduction reaction with sodium which comprises (1) maintaining under agitation a finely divided solid mixture comprising a sodium halide, said element and a lower halide of said element, (2) adding to said mixture (a) higher halide of said element and (b) element sodium, said sodium being added to said reaction mixture when the mixture is substantially devoid of the higher halide of said element and said higher halide being added to said reaction mixture when the mixture is substantially devoid of elemental sodium but contains said element per se in an amount sufficient to reduce the added higher halide of said element to a corresponding lower halide, said process being carried out at a temperature below the melting point of the reaction product mixture.

2. The process of claim 1, wherein the finely divided mixture to which the higher halide is added is maintained at a temperature sufficient for the particles of the element per se present in said mixture to reduce the added higher halide to a lower halide, but below the melting point of the finely divided solid product mixture of said reduction step.

3. The process of claim 1, wherein each of the materials (a) and (b) is added to a relatively larger amount by weight of the finely divided solid mixture.

4. The process of claim 1, wherein following the addition of the higher halide to said mixture and reduction thereof to a lower halide, the temperature of the resulting reaction mixture is decreased prior to the addition of sodium to said reaction mixture.

5. The process of claim 1 wherein said higher halide is titanium tetrachloride, said sodium halide is sodium chloride, said element is titanium and the lower halide of said element is titanium subchloride.

6. A process for reducing a higher halide of an element that can form more than one halide with a halogen, said higher halide being reducible to a lower halide of said element by reduction reaction with said element per se and said lower halide being further reducible by reduction reaction with sodium which comprises (1) maintaining under agitation a substantially free-flowing finely divided solid mixture comprising a sodium halide and said element per se, (2) adding to said mixture a higher halide of said element in an amount, based on the amount of said element per se present in said mixture, to reduce the added higher halide to a corresponding lower halide to provide a substantially free-flowing finely divided solid mixture comprising sodium halide and said lower halide, and (3) adding to the resulting finely divided mixture, while under agitation, molten sodium in an amount stoichiometrically sufficient to reduce said lower halides to said element, said process being carried out at a temperature below the melting point of the reaction product mixture.

7. The process of claim 6 wherein said element is titanium.

8. The process of claim 6 wherein the halide of said element and sodium is the chloride.

9. The process of claim 6 wherein a portion of the final reaction product mixture comprising sodium halide and said element is recycled to said reaction mixture.

10. A process for reducing a higher halide of an element that can form more than one halide with a halogen, said higher halide being reducible to a lower halide of said element by reduction reaction with said element per se and said lower halide being further reducible by reduction reaction with sodium which comprises (1) maintaining under agitation a substantially free-flowing finely divided solid mixture comprising a sodium halide and a lower halide of said element, (2) adding to said mixture sodium in an amount sufficient to reduce said lower halide to said element, and (3) adding to the resulting reaction mixture a higher halide of said element in an amount, based on the amount of said element per se present in said resulting reaction mixture, to reduce the higher halide to a corresponding lower halide to obtain a product mixture comprising sodium halide and the lower halide of said element, said process being carried out at a temperature below the melting point of the reaction product mixture.

11. The process of claim 10 wherein said initial mixture comprises sodium chloride and titanium subchloride.

12. The process of claim 10 wherein said final product mixture, comprising sodium halide and said lower halide is reacted in a separate reaction zone with sodium, in an amount sufficient to stoichiometrically reduce said lower halide to said element, and the resulting product mixture is subjected to elevated temperatures, above the melting point of the sodium halide, for a period of time sufficient to obtain said element in sponge form.

References Cited in the file of this patent

UNITED STATES PATENTS

| | | |
|---|---|---|
| 2,703,752 | Glasser et al. | Mar. 8, 1955 |
| 2,826,493 | Garrett et al. | Mar. 11, 1958 |
| 2,827,371 | Quin | Mar. 18, 1958 |
| 2,830,888 | Wade | Apr. 15, 1958 |
| 2,882,144 | Follows et al. | Apr. 14, 1959 |

FOREIGN PATENTS

| | | |
|---|---|---|
| 686,845 | Great Britain | Feb. 4, 1953 |
| 694,921 | Great Britain | July 29, 1953 |
| 717,930 | Great Britain | Nov. 3, 1954 |

OTHER REFERENCES

Wartman et al.: Bureau of Mines Report of Investigations, R.I. 4519, August 1949, page 13.